July 2, 1935.
D. J. VAN MARLE
2,006,703
PASTE FEED FOR DRIERS
Filed Feb. 14, 1931
2 Sheets-Sheet 1
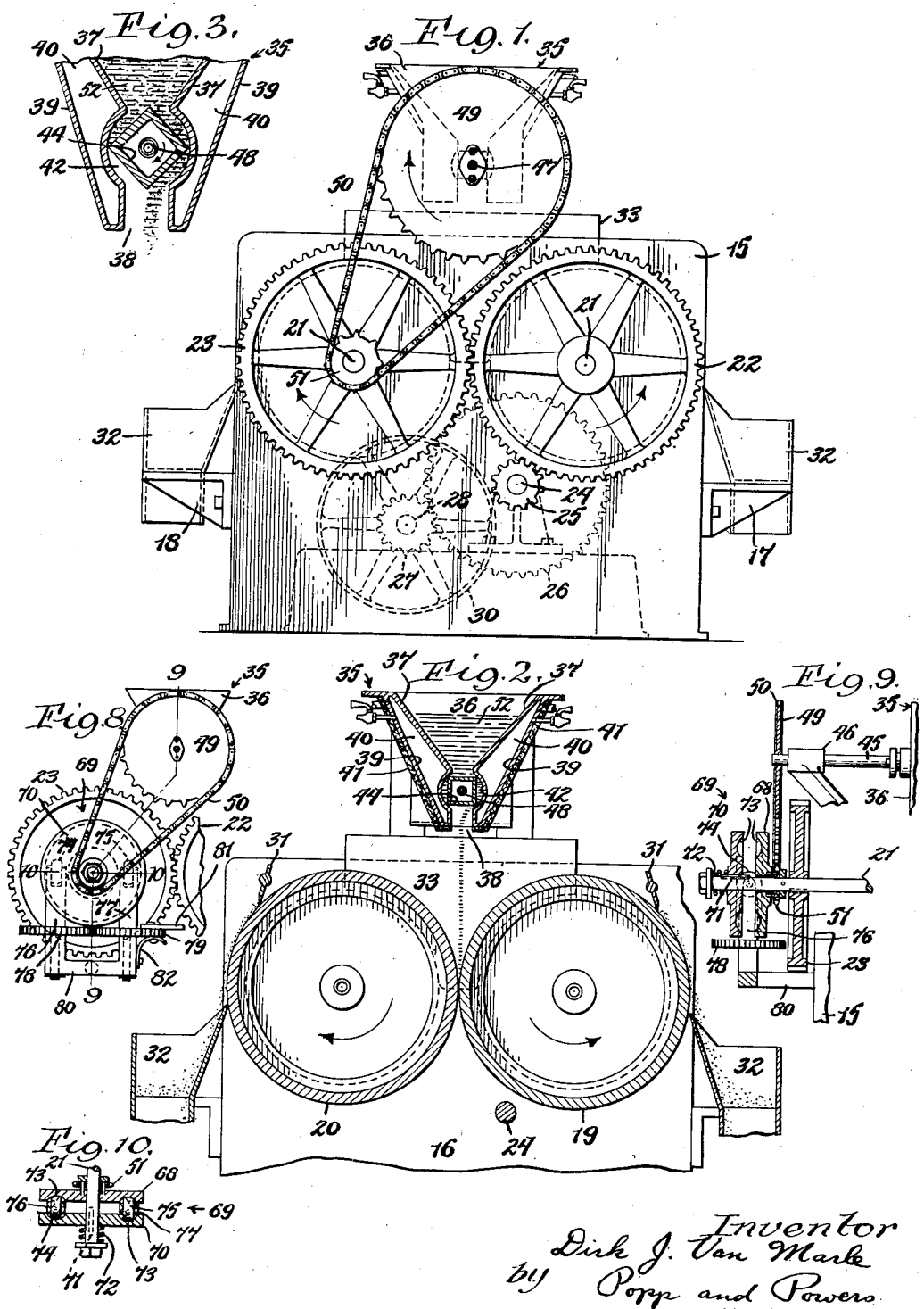

July 2, 1935.  D. J. VAN MARLE  2,006,703
PASTE FEED FOR DRIERS
Filed Feb. 14, 1931  2 Sheets-Sheet 2
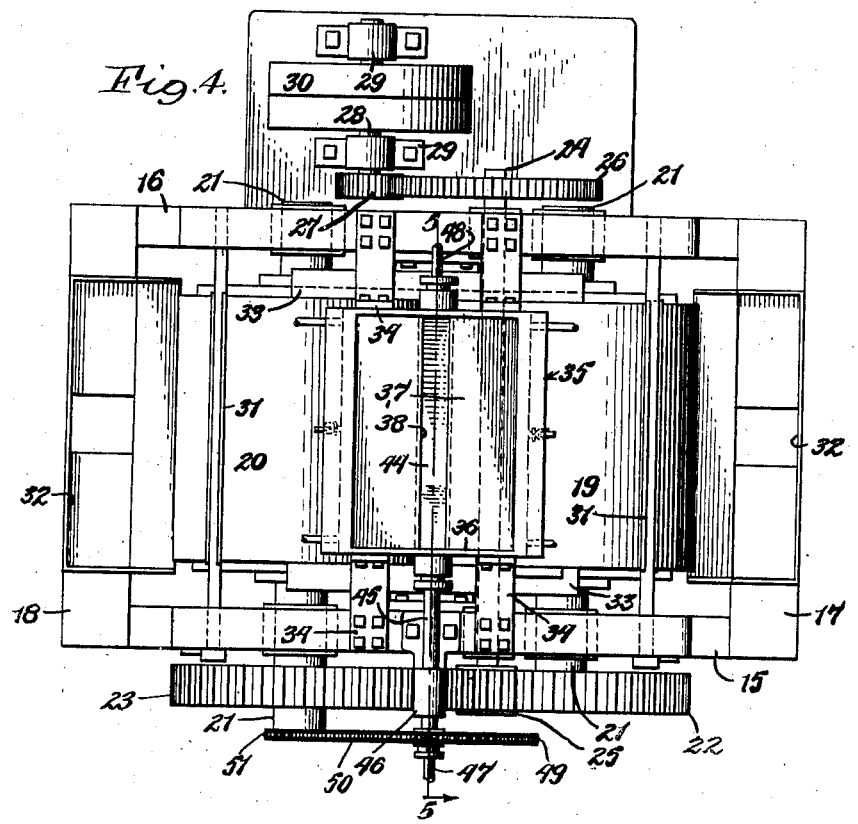

Patented July 2, 1935

2,006,703

UNITED STATES PATENT OFFICE 2,006,703

PASTE FEED FOR DRIERS

Dirk J. Van Marle, Buffalo, N. Y., assignor to Buffalo Foundry & Machine Co., Buffalo, N. Y., a corporation of New York Application February 14, 1931, Serial No. 515,785

3 Claims. (Cl. 159—11)

This invention relates to a paste feed for a drier of the rotary drum type and is more particularly directed to a paste feed for an atmospheric double drum drier.

The paste feed embodying the present invention is particularly designed for mixtures of solids and liquids, the fluidity of which is too low to be handled by a standard centrifugal, rotary or reciprocating plunger pump, but still sufficiently fluid to be handled by a gear pump or a diaphragm pump such as are used for handling the underflow of thickeners. Materials in this class are clay, cement, sewage sludge, barium sulfate, calcium sulfate or gypsum, calcium carbonate, whiting, chalk, lime, iron oxide, ochre, kaolin, yeast, fruit and vegetable pulps, cooked cereals, dye pastes, paints, pigments, dextrin, vegetable glues and pastes, starch and the like.

Therefore, the principal object of the present invention is to provide a positive feed of such pasty materials to the heated drum of a rotary drier which insures the delivery of a uniform amount of material in such a manner that it is spread upon the heated drum or drums so as to be uniformly dried while transversing the drums.

Another purpose is to provide such a feed which feeds uniformly over the whole length of the drum or drums, so that all of the heated surface of the drum or drums is employed in drying the pasty material.

Another purpose is to provide a positive feed for pasty material which is synchronized with the speed of the drums so that, whenever the speed of the drums is increased or reduced, the feed is changed correspondingly. The invention also comprehends the use of a variable speed mechanism between the drive of the drums and the drive of the paste feed so that the speed of the paste feed can be varied independently of the drum speed as the physical properties of the different materials may require.

A further aim is to provide such a paste feed in which there is no overflow and the amount of material fed to the drum or drums is limited to the amount of material which will actually adhere to the drum or drums. This is a distinct departure from present designs of feeds which all suffer from the disability that the feed exceeds the amount of material dried which makes it necessary to have a circulating device to take care of the overflow.

A further purpose is to provide a paste feeding device of this character which includes a hopper placed above the heated drum or drums, and which contains the pasty material to be dried, and in which the sides of the hopper are jacketed to permit either heating or cooling. In some cases, it is necessary to cool the hopper to prevent caking of the product and, in such cases, unless a jacketing is provided for the hopper, the hot vapors would not only heat the hopper and reduce or negative the efficiency of the coolant but would also condense on the hopper walls and fall back upon the drums.

Another purpose is to provide a paste feed of this character, the feed of which can be varied to suit products of different consistencies by varying the clearance between the stationary and movable part of feeding device to suit the particular product being dried.

Another purpose is to provide such a positive feed which includes a rotor for drawing materials from the hopper and depositing them on the heated surface of the drum or drums, and, in which, provision is made for passing a cooling or a heating medium thru the rotor so as to prevent caking of the material upon the rotor.

Other objects are to provide a feed which is simple and reliable in its operation, is inexpensive in its operation and construction, is composed of few parts and which will not get out of order or repair under conditions of constant service.

In the accompanying drawings:

Figure 1 is an end view of an atmospheric double drum drier equipped with a paste feed embodying my invention.

Figure 2 is a vertical transverse section therethru, showing the hopper jacketed.

Figure 3 is a fragmentary view similar to Fig. 2, showing the hopper provided with an insulating jacket.

Figure 4 is a top plan view of the double drum atmospheric drier in Figs. 1 and 2.

Figure 5 is a vertical longitudinal section therethru.

Figure 6 is a view similar to Fig. 3 and shows a modified form of the invention in which the sides of the hopper can be moved toward or from one another to vary the clearance between them and the rotor, and by which the feed of materials to the heated drum or drums can be varied to suit the consistency of the materials.

Figure 7 is a side elevation of the adjustable form of hopper shown in Fig. 6.

Figure 8 is a fragmentary end view similar to Fig. 1 and shows a variable speed gearing interposed between the drive for the heated drums and the drive for the paste feed, which permits of varying the feed of materials independently of the movement of the drums to suit different kinds of materials.

Figures 9 and 10 are sections taken on the corresponding lines of Fig. 8.

The invention is shown as embodied in connection with a double drum atmospheric drier although it will be understood that it can be applied to any other form of drier. The atmospheric double drum drier shown is, therefore, to be regarded as an example and is shown preferably constructed as follows:

The drier consists of stationary end heads 15 and 16, which are suitably connected by longitudinal members 17 and 18. Mounted between the end heads 15 and 16 is a pair of drums 19 and 20, these drums being hollow and having trunnions journaled in the end heads 15 and 16. To these trunnions 21, adjacent the end head 15, are secured a large pair of intermeshing gears 22 and 23, these gears 22 and 23 being of the same size so that the drums 19 and 20 are rotated in opposite directions and at the same speed. A counter shaft 24 extends thru the end heads 15 and 16 and is suitably journaled, this counter shaft 24 carrying a pinion 25 meshing with the gear 22, and at the opposite adjacent end head 16 carrying a gear 26. This gear 26 meshes with a pinion 27 on a main shaft 28, this drive shaft 28 being journaled in bearing stands 29 and carrying a pulley 30. It is apparent that, as the pulley 30 is turned, the drums 19 and 20 are rotated at the same speed but in opposite directions thru the train of gearing comprising the pinion 27 and gear 26, shaft 24, pinion 25, gear 22 and gear 23, and the corresponding drums. The drums 19 and 20 are heated in a usual and well known manner such as by the provision of means (not shown) for introducing live steam into these drums and discharging the condensate therefrom; a suitable form of means for this purpose being shown in the co-pending application of Herman E. Neubauer, Double drum drier, Serial No. 492,764 filed November 1, 1930.

The materials are dropped between the drums 19 and 20, and are carried thru the space or clearance there between so as to insure a uniform layer of material on each of the drums. The material is then carried around by the drums and since the drums are heated these layers or films of material are dried. The dried layer of each drum is scraped off by a scraping knife 31 associated with each drum. Each of these scraping knives 31 extends the full length of the corresponding drum and is journaled at the opposite ends in the end heads 15 and 16. The dried material scraped off by these scrapers 31 falls into a corresponding receiver or hopper 32, which is located at the side of the corresponding drum and is mounted on the longitudinal frame members 17 and 18. Suitable conveyors can be provided in these receivers 32 in the manner described in the said application of said Herman E. Neubauer.

The fluid materials to be dried are fed between the drums 19 and 20 and are prevented from flowing beyond the ends of these drums by end plates 33, which engage the opposite ends of both of these drums. The feed device for feeding the material between the end plates 33 and the drums 19 and 20 is preferably constructed as follows:

Suitably supported by brackets 34 on the end heads 15 and 16 is a hopper indicated generally at 35. This hopper comprises a V shaped end head 36 connected by inner walls 37, which converge downwardly and are spaced apart at their lower ends as indicated at 38 and by outer walls 39, the walls 37 and 39 being spaced apart to form a space 40 into which a heating medium or coolant can be introduced thru suitable pipes 43 as may be required. If desired, an agitator (not shown) can be provided in the hopper. The exterior walls 39 of the hopper are covered with a layer of a suitable insulating material 41, so that, when a coolant is passed into spaces 40 formed by the hopper walls, it is protected against being heated by the rising vapors from the drums 19 and 20 by the insulation 41 thereby permitting this coolant to operate at full efficiency in keeping the material in the hopper cool and preventing its caking. At the same time, the vapors rising from the drums 19 and 20 are prevented from condensing on the side walls 39 of the hopper and falling back upon the drums, which condensate falling back upon the drums would reduce their efficiency. The inner walls 37 of the hopper, which form the discharge opening 38, are formed to provide a cylindrical enlargement 42, which opens at the top into the hopper and opens at its bottom to discharge between the drums 19 and 20. In this cylindrical enlargement or chamber 42 is mounted a hollow rotor 44. This rotor can be made of sheet metal or, in case small and accurate clearances are required, can be machined, and is journaled at the opposite ends in the end walls 36 of the hopper by means of suitable trunnions 45. The rotor shown is shown as being square in cross section although it is obvious that any out of round rotor could be employed. The trunnion 45, at the end of the rotor adjacent the head 15, is extended and additionally journaled in a bearing 46 on the end head 15 of the machine frame, and a cooling or heating medium can be passed thru the rotor by means of pipes 47 and 48 connecting with the trunnion 45 and communicating with the interior of the rotor.

Externally of the bearing 46, a sprocket 49 is mounted on the corresponding trunnion 45 of the rotor and this sprocket 49, as best shown in Fig. 1, is connected by a chain 50 with a sprocket 51 mounted on the corresponding trunnion of the driving drum 20. It is therefore apparent that, as the drums 19 and 20 are rotated, the rotor 44 is also rotated in synchronism with these drums thru the sprocket 51, and chain 50, and sprocket 49 mounted on the trunnion of the rotor. As the rotor 44 rotates, as best shown in Fig. 3, the paste 52 in the hopper 35 is withdrawn from the hopper 44, forced around the cylindrical chamber 42 and discharged thru the lower end of the outlet 38 thru the space between the drums 19 and 20. Since the hopper 35 and rotor 44 extend the full length of the drums 19 and 20, it will be apparent that the paste is uniformly fed the full length of the drums so that the full length of the drums is covered with the film of the material to be dried and they can be operated at highest efficiency. Furthermore, by providing a positive feed of this character there not only can pasty materials be fed to the drums, but they can also be fed in the precise amount which the heating drums will handle, thereby avoiding an overflow of the excess paste fed to the drums and eliminating the necessity of collecting this overflow and returning it to the hopper 35.

In order to adjust the operation of the feed to materials of different viscosity, the sides of the hopper 35 can be designed so as to be adjustable toward and from one another and thereby vary the clearance between these sides and the rotor 44, such construction being shown in Figs. 6 and 7, and being preferably constructed as follows:

In this construction, the end heads 53 are independent from the side walls 54 of the hopper. Each of these side walls consists of an inner wall 55, an outer wall 56, and end walls 57 forming a chamber 58 thru which a heating or cooling medium can be passed by means of pipe connections 59. At the upper end of each of the end walls 57, a trunnion 60 is arranged to project outwardly and these trunnions are journaled in the end heads 53 so that the sides 54 of the hopper swing toward and from one another. As in the preferred construction, the inner walls 55 of both sides of the hopper are formed to provide a cylindrical chamber 61, which communicates with the interior of the hopper and also with the discharge opening 62 at the bottom of the hopper between the side walls 54. In the cylindrical chamber, as in the preferred construction, is arranged a hollow rotor 63, which is rotated and heated or cooled in the same manner as the rotor 44 of the construction shown in the Figs. 1–5. At each end of each of the side walls 54, a pair of wings or brackets 64 project downwardly and between each pair of these wings or brackets a nut 65 is arranged. Each of these nuts 65 is provided with a trunnion 66 journaled in the brackets or wings 64, and thru the corresponding pair of nuts 65 at each end of the hopper a double screw 67 extends. This screw 67 can be turned in any suitable manner and, since it is threaded in opposite directions, upon turning the screw 67, the nuts 65 are moved toward and from one another and the side walls of the hopper also moved toward and from one another to vary the clearance between the hopper walls 54 and the rotor 63, and thereby adjust the feed of the rotor 63 to suit the particular material being fed to the heated drums.

Another manner in which the feed of the rotor can be varied to suit different materials is by providing a variable speed device between the drive for the heated drums 19 and 20 and the drive for the rotor. Such a variable speed device is illustrated in Figs. 8 and 10, and is preferably constructed as follows; although it will be understood that any form of variable speed device could be employed in place of that specifically shown and described:

As best shown in Fig. 9, the sprocket 51 is loosely mounted on the corresponding trunnion 21 on the drum 20. This sprocket 51, as in the construction shown on Figs. 1–5, is connected by a chain 50 with a large sprocket 49 connected with the rotor 44. This sprocket 51 is also fastened to the driven disc 68 of the variable speed gearing indicated generally at 69. This driven disc 68 is also loose on the trunnion 21 and cooperates with a driving disc 70 on which it is keyed to the trunnion 21, this key 71 compelling the rotation of the driving disc 70 but permitting this driving disc to be moved toward and from the driven disc 68. The driving disc 70 is urged toward the counter part driven disc 68 by a spring 72. The opposing faces of these discs 68 and 70 are provided with curved and concentric, annular recesses 73 which receive the peripheries of two swinging pulleys 74 and 75, which are pivoted central to curved recesses 73 on yokes 76 and 77 to which yokes intermeshing gears 78 and 79 are secured. The yokes are mounted in any suitable manner on a bracket 80, and one of the gears 79 is turned by means of a handle 81 and its adjusted position maintained by a spring detent 82. By this form of transmission motion, it is apparent, by turning the handle 81, both gears 78 and 79 and their yokes 76 and 77 will turn. This causes the pulleys 74 and 75 to be swung on so that their peripheries engage, respectively, the outer or marginal part of the groove 73 in the driving disc 70 and the inner part of the groove in the driven disc 68, as shown by dotted lines in Fig. 10, in which case the driven disc 68 will be rotated at slower speed than the driving disc 70; the pulleys will be swung to the full line perpendicular position shown on Fig. 10, in which case the speed of the driving and driven discs will be the same, or the pulleys will be swung so that their peripheries engage with the outer or marginal part of groove 73 of the driven disc 68, or the inner or center part of the groove 73 of the driving disc 70, in which latter case the driven disc 68 will be driven at a greater speed than the driving disc 70. It is therefore apparent that by means of the variable speed gear 69 shown, or any other suitable form of gearing, the rotor 44 can be operated at any desired speed and therefore when a more viscous paste is being fed, it can be rotated faster relative to the speed of drums 19 and 20, and can therefore feed the same amount of material to these drums as if a less viscous material were being fed at a slower rotor speed.

It will be noted that in all of the forms of the invention, the rotor and the discharge from the hopper are located a substantial distance above the valley between the drums. This is to avoid heating of the rotor and hopper through contact with or close proximity to the heated drums. In handling paste it is essential that the paste stay in a pasty condition until it is actually deposited on the drums since drying of the paste before being discharged from the hopper will clog up the feed mechanism and defeat applicant's purpose. To avoid this condition applicant's hopper outlet is arranged well above the drum surface and the paste is dropped a substantial distance into the valley between the drums.

It will also be noted that the form of rotor employed at all times seals the outlet of the hopper. Thus at all times two corners of the rotor are in contact with the opposite semi-cylindrical faces of the chamber in which the rotor rotates so that at no time can the paste in the hopper flow past the valve and the paste can only pass by rotating the valve. There is therefore a continuous seal between the rotor and the cooperating faces of the hopper which renders a discharge of paste possible only by rotating the rotor under which operation the amount of paste discharged is exactly controllable by regulating the rotor speed.

It will also be observed that in feeding the paste onto the full length of the drums, the paste is dropped from a substantial height in the form of a thin attenuated stream or sheet, as illustrated in Fig. 2, thereby uniformly distributing the paste along the full length of the drums.

From the foregoing, it will be apparent that the present invention provides a feed for pasty materials which feeds this material uniformly over the whole length of the heating drum or drums of the drier; this feed is positive and is synchronized with the drums so that the exact amount of the material which the drums can handle is fed to the drums and all overflow eliminated, provision being made for varying the feeding capacity of the rotor either by the provision of a variable speed gearing in the drive for the rotor, or by adjusting the clearance between the rotor and the hopper walls; the sides of the hopper permit the introduction of the heating or cooling media and the hoppers are so jacketed that the vapors from the heating drums neither heat the coolant or condense on the hopper, and provision is made for heating or cooling the feeding rotor so as to positively prevent the caking of material on this rotor.

I claim as my invention:

1. A paste feed for a rotary drum drier, comprising a double walled hopper arranged above the drum and having a discharge opening in its bottom, a rotor controlling the flow of paste thru said discharge opening, means for driving said rotor, means for passing a fluid thru the double walls of said hopper to maintain a desired condition of the paste therein, and means for passing a similar fluid thru said rotor.

2. A paste feed for a drier, including a pair of parallel closely spaced drums and means for driving and heating said drums, comprising a paste hopper spaced above the valley between said drums and having a lower elongated discharge opening extending substantially the full length of said drums parallel thereto and arranged to drop the paste from the hopper to fall through the air a substantial distance into the valley between said drums, the opposing longitudinal inner faces of the side walls of said discharge opening being formed with coaxial semi-cylindrical faces extending parallel with the axes of said drums, and means for controlling the discharge of paste from said hopper, comprising an out of round rotor arranged coaxially between said semi-cylindrical walls and spaced a substantial distance from said drums, said semi-cylindrical walls and rotor being so formed that an edge of said rotor is at all times traversing each of said semi-cylindrical surfaces thereby to provide at all times a seal between said rotor and the cooperating faces of the hopper and means for rotating said rotor and the spacing of said rotor and hopper from said heated drums avoiding drying of the materials before being deposited in said valley.

3. A paste feed for a drier, including a pair of parallel closely spaced drums and means for driving and heating said drums, comprising a paste hopper spaced above the valley between said drums and having a lower elongated discharge opening extending substantially the full length of said drums parallel thereto and arranged to drop the paste from the hopper to fall through the air a substantial distance into the valley between said drums, the opposing longitudinal inner faces of the side walls of said discharge opening being formed with coaxial semi-cylindrical faces extending parallel with the axes of said drums, and means for controlling the discharge of paste from said hopper, comprising an out of round rotor arranged coaxially between said semi-cylindrical walls and spaced a substantial distance from said drums, said semi-cylindrical walls and rotor being so formed that an edge of said rotor is at all times traversing each of said semi-cylindrical surfaces thereby to provide at all times a seal between said rotor and the cooperating faces of the hopper, means for rotating said rotor and means for adjustably moving the hopper walls toward and from one another to vary the clearance between the rotor and the cooperating faces of the hopper and the spacing of said rotor and hopper from said heated drums avoiding drying of the materials before being deposited in said valley.

DIRK J. VAN MARLE.